3,748,093
COMPOSITIONS AND METHODS FOR WHITENING
AND BRIGHTENING LAUNDRY
William J. Gangwisch, New Brunswick, Robert Henry Trimmer, Edison, and William Franklin Gross, Jr., Piscataway, N.J., assignors to Colgate-Palmolive Company, New York, N.Y.
No Drawing. Continuation-in-part of application Ser. No. 166,002, July 26, 1971. This application Apr. 3, 1972, Ser. No. 240,851
Int. Cl. C09b 7/00
U.S. Cl. 8—137                             19 Claims

ABSTRACT OF THE DISCLOSURE

Improved whitening and brightening of laundry, especially cotton articles, are obtained by treating such laundry with an aqueous solution of blue dye or mixture of such dyes which is substantive to the articles of laundry and is capable of tinting them with a slight blue color, removable by a chlorine bleach, and a fluorescent brightener substantive to the articles and resistant to chlorine and sunlight bleaching. The dye or mixture of dyes gives the laundry a desirable blue tint when it is not subjected to chlorine or sunlight bleaching and when such bleaching is effected and the blue is bleached (it is no longer needed to counteract any yellow of the laundry because that, too, is bleached) the bleach-stable brightener exerts its brightening effect. Unlike treatments wherein bleach-resistant dyes are employed, any buildup of bluing due to repeated treatments may be removed.

Also disclosed are compositions of such mixed dyes and brightener, and detergent compositions containing them.

---

This is a continuation-in-part of our U.S. patent application S.N. 166,002, filed July 26, 1971.

This invention relates to improving the appearances of laundry and other textile articles by making them whiter and brighter, due to the actions on them of dyes and fluorescent brighteners. More particularly, it relates to composition containing a blue dye or a mixture of such dyes which is substantive to articles of laundry and tints them slightly blue, which color is removable by chlorine bleaching, and a fluorescent brightener which is substantive to such articles and is resistant to chlorine and sunlight bleaching. The invention also relates to detergent and other compositions containing such mixed bluing dyes and fluorescent brighteners and to methods for employing such mixtures.

In the washing of laundry or textiles with detergent compositions which do not contain bluing agents or fluorescent brighteners the washed clothes often exhibit a yellowish color, apparently due to materials deposited on or remaining on the articles washed, which materials adsorb blue light. To counteract this effect bluing agents have been employed either in separate bluing operations or incorporated with the detergent materials. The bluing agents are also somewhat substantive to the textiles and absorb more yellow light, whereby the reflectance of the blue light gives the clothes a whiter appearance which consumers favor. Even if the bluing color predominates so that the appearance of the material washed is a slight but distinctive blue such laundry is favored over that washed without bluing.

With the advent of fluorescent brighteners, organic compounds which convert invisible ultraviolet rays to visible light, materials laundered could be brightened or increased in apparent reflectivity. Some fluorescent brighteners emit light with a slight reddish or other tint which can be improved in color and made to appear whiter by the presence of a bluing agent. Also, different bluing agents or substantive dyes can be blended so that the different bluish tints thereof balance to produce a purer blue, causing a better whitening of materials treated. Such combinations are described in our parent U.S. patent application S.N. 166,002. By proper selection of substantive bluing dyes a highly acceptable bluing effect can be produced on textiles or laundry treated and any adverse yellowing of the materials or reddish or violet tints due to the fluorescent brighteners can be overcome.

A disadvantage of the fluorescent brighteners has been their susceptibility to discoloration or removal by chlorine bleaches. In some cases the brighteners turn into visible dyes of startlingly strong colors, e.g., red; in other instances they are completely destroyed by subjection to chlorine bleaches and the treated laundry is not brightened. However, it has been now been discovered that, unlike most fluorescent brighteners, some are resistant to chlorine and sunlight bleaching. Consequently, when the housewife or other consumer bleaches the laundry with a hypochlorite bleach a fluorescent brightening effect is still obtainable. This is also present after drying of the laundry in direct sunlight. As a result of the use of such fluorescent brighteners, compositions containing them have been found to be preferred when tested against prior art products. However, the chlorine bleach- and sunlight-stable brighteners are generally utilized at lower concentrations than those which lack such stability, often for economic reasons, and therefore do not give as great a comparative brightening effect when used without chlorine or sunlight bleaching. It has now been found that consumer preference for the prior art product under non-bleaching conditions may be changed to parity or a preference for a bleach-stable fluorescent brightener product if there is present with such brightener a blue dye or a mixture of such dyes which is substantive to textiles or articles of laundry to which it is applied from a dilute aqueous solution and which is capable of tinting such items with a slight blue color. Such dyes, preferably those of our parent application identified as C.I. Direct Blue 1, C.I. Direct Violet 66, C.I. Acid Blue 205 and C.I. Direct Blue 98, allow the production of a balanced pure blue coloration of the material treated, which coloration is substantive to such materials and yet is removable from them when they are subjected to chlorine bleaching. Therefore, by following the method of this invention and utilizing the compositions thereof, whitening and brightening effects are obtainable which are superior or at least, equal to conventional brightening and bluing effects under all conditions, including chlorine bleaching, sunlight bleaching and non-bleaching. When bleaching or sunlight bleaching of laundry is practiced the stable fluorescent brightener exerts a strong brightening effect on the laundry and results in its being favored by consumers in comparison tests against control products. In such cases it does not matter that the blue dyes are removed due to the bleaching conditions. When no bleaching is practiced, although the proportion of the chlorine- and light-stable fluorescent brightener may be much less than that of the fluorescent brightener in a control treatment, the presence of the present bluing agent combinations makes up for this deficiency and results in parity or superiority for the "experimental" treatments. The further advantage of the method is that the blue dyes or mixtures thereof are removable from the clothing by chlorine bleaching so that there is no unavoidable cumulative overbluing effect experienced due to repeated washings with the invented compositions.

In accordance with the present invention a composition for increasing the apparent whiteness of laundry to the human eye comprises a blue dye or mixture of such dyes which is substantive to articles of laundry to which it is applied from a dilute aqueous solution and is capable of tinting such items with a slight blue color bleachable therefrom by a chlorine bleach, and a fluorescent brightener substantive to such articles to which it is applied from a dilute aqueous solution and resistant to chlorine and sunlight bleaching. Preferably, such composition is a part of a synthetic organic detergent product or other product for treating laundry or textiles, such as a fabric softener, anti-static agent, laundry pre-soak, water softener or germicide.

The blue dyes which are used are those having the characteristics previously described but most preferably they will be same as those mentioned in our parent application S.N. 166,002. These dyes are particularly suitable for use with the preferred brighteners, discussed below. They contain in their structures a plurality of nuclear radicals selected from the group consisting of substituted and unsubstituted cyclohexyl, phenyl, naphthyl, anthracenyl and anthraquinonyl, at least one of which is substituted with a sulfonic acid or metal sulfonate group, preferably an alkali metal sulfonate, e.g., sodium sulfonate, and at least one of which is linked to another nuclear radical of the described class by an azo or amino group. In preferred embodiments of the invention there are present two substituted naphthyl groups and two substituted phenyl groups, the phenyl substituents being selected from the group consisting of lower alkoxy (of up to 3 carbon atoms), hydroxy, sulfonic acid, sulfonate, and sulfonamide, and the naphthyl substituents being selected from the group consisting of amino, sulfonic acid, sulfonate, and hydroxy, with at least two azo groups being present in the molecule, linking the substituted phenyl and substituted naphthyl groups. Although in some of these compounds the phenyl groups may be linked together directly, as in diphenyl, the naphthyls are preferably linked by an amino group in those cases where diphenyl linkages are not present. Similar linking may be effected between cyclohexyl radicals, present in place of the substituted phenyl groups, and in such cases linkages, which may be to naphthyl, anthraquinonyl or anthracene groups may be through amino or sulfonamide radicals.

The most preferred dyes are C.I. Direct Blue 1, marketed by Geigy Corp. as Direct Brilliant Sky Blue 6B Extra Conc. and C.I. Direct Violet 66, also marketed by Geigy Corp., as Solophenyl Violet 4BL, preferably employed in combination to give a pure blue resultant color. Instead of C.I. Direct Violet 66 there may be employed a similar dye, sold as Sirius Supra Violet BL. In place of the mentioned dyes, which are generally utilized in two-member combinations, there may be used C.I. Direct Blue 98 and C.I. Acid Blue 205, the former of which is identified as Sirius Super Blue BRL and which is marketed by Verona Dyestuffs Division of Verona Corp.

The fluorescent brighteners which have been found to be most useful in the practice of this invention are 4,4'-bis(4-phenyl-2H-1,2,3-triazol-2-yl)-2,2'-stilbene disulfonic acid and salts thereof, which salts are preferably alkali metal salts, e.g., the dipotassium salt, and bis(stilbene sulfonic acid) and similar salts thereof. Bis(stilbene sulfonic acid) designates the fluorescent brightener of the structure

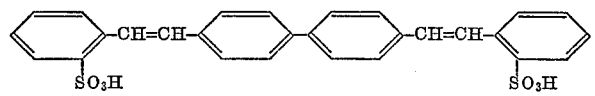

Both these brighteners coact with the dyes to give superior whitening effects.

Normally in the preferred dye-brightener combinations employed there will be present from 1 to 100 parts of C.I. Violet 66 for every 3 to 300 parts C.I. Direct Blue 1 (ratio of 1:1 to 1:10), together with 100 to 1,000 parts of the mentioned fluorescent brightner(s). Generally also, it will be preferred to employ the 4,4'-bis(4-phenyl-2H-1,2,3-triazol-2-yl)-2,2'-stilbene disulfonic acid, dipotassium salt, sold by Verona Corp. as Phorwite BHC, hereafter referred to as BHC, since it appears to be somewhat more effective than the bis(stilbene sulfonic acid). See U.S. Pat. 3,485,831 for description of a method of manufacturing BHC and Canadian Pat. 823,683 for bis(stilbene sulfonic acid).

In preferred embodiments of the invention the dye-brightener composition is included in a carrier, such as a detergent, fabric softener, etc., as previously described. Such incorporation allows the effective plural treatments of laundry or textiles and the most common of such carriers is preferably a detergent composition such as a built heavy duty laundry product. Nevertheless, the compositions of the dyes and brighteners may be produced for subsequent additions to other products and, if desired, the dye-brightener compositions may be directly applied, in aqueous solution, to laundry or other materials to be treated. When employed in detergents or with other carriers, the proportion of fluorescent brightener is from 2 to 1,000 times the weight of the total of the dyes used the combination of the fluorescent brightner and dye(s) will be from 0.04 to 40% of the carrier weight, preferably from 0.04 to 2% thereof and most preferably from 0.1 to 0.5% thereof. The balance of the compositions may be active ingredient(s) of the various products, usually from 0.5 to 50% thereof, builder(s), adjuvant(s) and filler(s). Typical fillers include sodium sulfate, talc, clays, and sodium chloride. Of course, solvents such as water and alcohol may be also useful to carry the active ingredient, dye(s) and brightener(s) and to assist in their application.

In the preferred use as a constituent of a detergent composition, which compositions will comprise from 5 to 85% of a synthetic organic detergent or mixture thereof selected from the group consisting of anionic, nonionic and amphoteric detergents and 15 to 95% of compound(s) selected from the group consisting of builder(s), filler(s), solvent(s) and adjuvant(s), there will be present from 0.0001 to 0.0010% of C.I. Direct Violet 66, from 0.0003 to 0.003% of C.I. Direct Blue 1 and 0.1 to 1% of the dipotassium salt of BHC or its equivalent or of bis(stilbene sulfonic acid) or its equivalent. In place of the individual fluorescent brighteners, a mixture thereof may be employed, normally containing from 20 to 80% of one of the mentioned brighteners. The detergent will generally be from 0.1 to 0.4% of the wash water.

In preferred compositions the detergent is a heavy duty built synthetic anionic-nonionic detergent composition in particulate form and comprises from 5 to 30% of a synthetic anionic organic detergent or mixture thereof selected from the group consisting of higher alkyl benzene sulfonate, higher fatty alcohol sulfate, higher fatty alcohol ethoxylate, higher olefin sulfonate and higher fatty acid soap, from 1 to 10% of a nonionic detergent or mixture selected from the group consisting of ethylene oxide condensates with higher aliphatic alcohols, ethylene oxide condensates with middle (7–9 carbon) alkyl phenols and ethylene oxide condensates with polypropylene oxide and polypropylene glycol, and 20 to 95% of a builder or builder mixture selected from the group consisting of pentasodium tripolyphosphate, trisodium nitrilotriacetate, sodium silicate, sodium carbonate, sodium citrate and sodium gluconate. Normally the proportion of nonionic detergent is less than half that of the anionic detergent. By "higher" is meant from 10 to 20 carbon atoms, preferably from 12 to 18 carbon atoms and most preferably these are in linear arrangement. The built detergents are normally spray dried and substantially globular in shape and sizes substantially within the range of 6 to 160 mesh.

In use of the present compositions, they are added to laundry to produce a dilute aqueous solution from which the blue dyes are capable of tinting items of laundry with a slight blue color and the fluorescent brightener is substantive to the laundry, causing it to appear visibly brighter than untreated materials. In such applications the total weight of dyes and fluorescent brightener is usually from 0.00004 to 0.004% of the aqueous medium in which a textile charge of laundry is being treated or washed and the weight of the laundry or textile being subjected to treatment is from 5 to 10% of the weight of the aqueous solution. Laundering is conducted at any of a wide variety of temperatures, e.g., 10 to 90° C., the present methods being applicable to washing in cold as well as hot water and in both hard and soft waters. The treatment or washing period is normally from five minutes to one hour and after completion of the treatment the laundry is rinsed with water and is dried in normal fashion. Of course, it may be sunlight dried and may be bleached before or after drying without destroying the brightness contributed by the fluorescent brighteners.

Whitening and brightening effects are very noticeable on cottons but are also apparent on synthetics such as polyesters and nylons and mixtures thereof. The compositions and methods are also found very effective when applied to normally soiled laundry, clean laundry or laundry previously treated with standard detergent compositions, most of which contain bleachable fluorescent brighteners. The acceptance of the products and methods is by a significant majority of evaluators when compared with products or methods utilizing ordinary fluorescent brighteners when the laundry treated is subjected to sunlight or chlorine bleaching. When the laundry is not bleached parity is obtainable even with much less fluorescent brightner although without the present bluing agents or the use of much more fluorescent brightener inferior results are obtained. This good result is unexpected in view of the great brightening effects obtained from the excess of brightener content of the control compositions.

Although the dyes and brighteners may be blended together as a powder or in liquid form, usually for later inclusion in other compositions, they are most preferably spray dried with built synthetic organic detergent crutcher mixes into particulate substantially globular, free-flowing form. For most organic-based detergents the active detersive ingredient will be an anionic detergent and the more preferred products of this type will include nonionics, although they may interfere somewhat with flowability. Mixtures of such materials and amphoterics may also be used. The anionic detergents will normally contain from 8 to 26, preferably 10 to 20 carbon atoms in a higher organic hydrophobic group, and will have present at least one water-solubilizing radical selected from the group consisting of sulfonates, sulfates, carboxylates, phosphates and phosphonates, to produce a water soluble detergent. Examples of suitable anionic detergents are water soluble sulfated and sulfonated synthetic detergents containing an alkyl radical of 8 to 20, preferably 12 to 18 carbon atoms. Such radical may be a portion of a higher acyl group. Preferred examples of sulfonated anionic detergents are the higher alkyl aromatic sulfonates, such as the linear higher alkyl benzene sulfonates containing from 12 to 18 atoms in the higher alkyl group. Branched chain materials may also be used, but are not preferred. The sodium, potassium, ammonium and lower alkanolamine salts of such sulfonic acids are preferred. In some cases, higher alkyl toluene sulfonates and higher alkyl naphthalene sulfonates may be beneficially employed. Of the linear alkyl benzene sulfonates, those of 12 to 15 carbon atoms in the chain and wherein the salt forming cation is sodium are much preferred. These usually will be terminally or 2-substituted on the benzene ring. However other points of joinder to the benzene may be employed and the main factor in producing a successful detergent of this type is to have the chain linear so as to promote biodegradability of the product.

Included among other anionic detergents which may be employed are the olefin sulfonates e.g., long chain alkene sulfonates, long chain hydroxyalkane sulfonates and mixtures thereof. These are usually of 8 to 25 carbon atoms, preferably of 12 to 20 carbon atoms. Also useful are the paraffin-derived sulfonates containing about 10 to 20, preferably 15 to 20 carbon atoms. Examples are the primary paraffin sulfonates made by reaction of long chain alpha olefins with bisulfites and those compounds having the sulfonate group distributed along the paraffin chain. Sodium and potassium sulfates of higher alcohols containing 8 to 18 carbon atoms, such as sodium lauryl sulfate and sodium tallow alcohol sulfate may be employed, as may be the sodium and potassium salts of alpha-sulfofatty acid esters of 10 to 20 carbon atoms in the acyl group, e.g., methyl alpha-sulfomyristate and methyl alpha-sulfotallowate. The sodium and ammonium sulfates of mono- and diglycerides of higher fatty acids, e.g., coconut oil fatty acids monoglyceride monosulfate, stearic diglyceride monosulfate, are also useful, as are the sulfated condensation products of polyethoxyethanols with fatty alcohols and the sulfonates of higher alkyl glycerol ethers. The alkyl phenyl polyethoxy ether sulfates having about 1 to 6 oxyethylene groups per molecule are useful anionic detergents when the alkyls are of about 7 to 9 carbon atoms. Such a range of carbon atoms is considered as "middle" alkyl. Other useful anionic detergents include the higher acyl sarcosides, isethionates and N-methyl taurides. These detergents, while normally used as their ammonium, alkanolamine, or alkali metal salts, may often be employed as soluble alkaline earth metal salts. The water soluble salts, e.g., the sodium, ammonium and alkanolamine salts, of higher fatty acids containing about 8 to 20 carbon atoms, preferably 10 to 18 carbon atoms, are good anionic detergents, too. The suitable fatty acids for making such soaps can be obtained from animal and vegetable oils, fats and waxes, e.g., tallow, grease, coconut oil, tall oil and various mixtures thereof. Preferred are the sodium soaps of the fatty acids derived from the mixture of coconut oil and tallow.

The nonionic synthetic organic detergents are usually condensation products of organic aliphatic or alkyl aromatic hydrophobic compounds and hydrophilic lower alkylene oxide groups. A wide variety of hydrophobic compounds which include carboxy, hydroxy, amido or amino groups having a free hydrogen on the nitrogen can be condensed with a lower alkylene oxide or equivalent, such as ethylene oxide, polyethylene oxide, or polyethylene glycol to form the nonionic detergents. Useful hydrophobes are higher aliphatic alcohols, middle alkyl phenols, higher fatty acids, carboxamides, mercaptans and sulfonamides. The ethylene oxide condensates of such materials usually include from 5 to 50 moles of ethylene oxide but as many as 200 moles may often be present. The hydrophobic groups will generally contain at least about 6 carbon atoms but may contain as many as 50. A preferred range is from about 8 to 30 carbon atoms in the hydrophobe. The ethylene oxide or the corresponding glycols or polyderivatives thereof are preferred but other lower alkylene oxides, such as propylene oxide, may also be of use and in some cases butylene oxide can be employed, generally in minor proportion. Other nonionic compounds included as active detersive ingredients are the polyoxyalkylene esters of higher fatty acids which will generally contain from 12 to 30 moles of ethylene oxide per mole of fatty acid of 10 to 22 carbon atoms. The alkylene oxide condensates of higher fatty acid amides are useful and these will usually have present from 10 to 50 moles of ethylene oxide per mole of 8 to 22 carbon atoms fatty acid group. Corresponding carboxamides and sulfonamides are also useful. Oxyalkylated higher aliphatic alcohols are especially preferred nonionic compounds, utilizable in conjunction with the linear higher alkyl benzene sulfonate anionic detergents. The fatty alcohols will usually have from 10 to 18 carbon atoms and the polyoxyethylene group will contain from 6 to 30 moles of ethylene oxide, preferably from about 6 to 12 moles thereof when the alcohol is of 12 to 16 carbon atoms. Such nonionics are sold as Neodols by Shell Chemical Co.

Hydrophobic groups of the nonionics can be made by condensing polyoxypropylene or polyoxybutylene radicals, in which case the subsequent condensation with ethylene oxide or polyoxyethylene groups results in the production of a nonionic detergent such as those sold under the names Ucon and Pluronic. In the Pluronics the block copolymers made are of ethylene oxide, propylene oxide and some propylene glycol and have a molecular weight in the range of about 1,000 to 15,000. The polyethylene oxide content thereof will usually be from 20 to 80% by weight and the preferred hydrophobic moiety weight is from about 1,000 to 4,000. Nonionics may be derived by the condensation of ethylene oxide with the reaction product of propylene oxide and ethylene diamine, in a manner similar to that employed for the preparation of the Pluronics. Various other nonionic detergents which may be used include the ethylene oxide adducts of monoesters of hexahydric alcohols and inner ethers thereof, with the higher fatty acids being of about 10 to 20 carbon atoms, e.g., sorbitan monolaurate, mannitan monopalmitate. Additional nonionic detergents that have been found to be very useful are the amine oxides of the general formula $R^1R^2R^3N \rightarrow O$, wherein $R^1$ is a higher alkyl of 10 to 20 carbon atoms and $R^2$ and $R^3$ are lower alkyls. Similar compounds wherein the nitrogen is replaced by phosphorus are also usable.

Although usually not employed in detergent compositions, amphoteric detergents are useful. These are generally water soluble salts of derivatives of aliphatic amines which contain at least one cationic group, e.g., quaternary ammonium, non-quaternary nitrogen or quaternary phosphonium, one or two alkyl groups of about 8 to 18 carbon atoms and an anionic water solubilizing carboxyl, sulfo, sulfato, phosphato or phosphono group. The groups may be straight chained or branched and the cationic nitrogen or phosphorus may be in a heterocyclic ring. Examples of such amphoteric detergents include the alkyl beta-aminopropionates, the alkyl betaiminodipropionates, the alkyl and hydroxyalkyl taurinates and the long chain imidazole derivatives, such as those described in British Pat. 1,412,-921 and U.S. Pats. 2,773,068, 2,781,354 and 2,781,357. Preferred detergents of this type are sodium N-lauryl beta-aminopropionate and disodium N-lauryl iminodipropionate.

Cationic surface active agents are usually avoided in the present detergent compositions but may be employed when there are no anionics present or when a laundry treating composition is used primarily for its antibacterial activity. Examples of the cationic detergents are the normal primary amines wherein the alkyl group is of 12 to 15 carbon atoms, and the corresponding diamines. Quaternary ammonium compounds of the known type, preferably those having 1 or 2 higher alkyl groups and 2 or 3 lower alkyl groups attached to the nitrogen and wherein the solubilizing anion is a halogen are also useful, as are equivalent quaternaries of high antibacterial activity, which are well known in the art.

The builder salt for the detergent composition will be chosen so as to produce good building and physical effects and to comply with laws and regulations concerning detergent composition components. Thus, for non-phosphate, non-NTA detergents it is preferred to employ silicates and carbonates and where carbonates are restricted, the formulations will generally utilize silicates as the main organic builders. In such products anionic detergent and nonionic detergent will usually be present, somtimes with soap as one of the anionics, and the normal adjuvants, including antiredeposition agent, such as polyvinyl alcohol or sodium carboxymethyl cellulose. Where phosphate contents are not limited phosphates usually will be present to the extent of 10 to 40% of the composition and the preferred phosphate is pentasodium tripolyphosphate. The preferred filler salt is sodium sulfate, which also favorably influences the properties of the detergent or carrier composition.

It is evident that liquid detergents and liquid preparations may be employed in which the proportions of various ingredients are about the same as for the powders, on the solids basis, with the proportion of solvent normally being from 50 to 99%. The liquid products may be in the forms of solutions, suspensions or emulsions. Similarly, gels, pastes, foams and other physical forms of the product may be used.

The various adjuvants that are used, in addition to the fluorescent dyes, include germicides, fungicides, perborate bleaches, enzymes, soil suspending agents, fabric softeners, thickeners, corrosion inhibitors, sequestrants, tarnish inhibitors, perfumes and various other materials intended to improve the functional and aesthetic properties of the detergents. Such materials are well known in the art and need not be described at length here.

Among the additives for detergent compositions are materials which may be employed alone in other laundry preparations with the present dye mixtures. For example, enzymes may be added to detergents or may be incorporated in a pre-soak product. Among such enzymes are those of the proteolytic type, including subtilisin, bromelin, papain, trypsin and pepsin. Soil suspending materials, e.g., sodium carboxymethyl cellulose, methyl cellulose and hydroxypropyl methyl cellulose may be in the detergent or pre-soak compositions. Useful bactericidal effects may be obtained by adding germicides to the detergent or by utilizing these in separate treatments after washing has been completed. Fabric softening compositions may be employed in a similar manner. Exemplary of useful cationic softeners are distearyl dimethyl ammonium chloride, lauryl trimethyl ammonium bromide and stearyl dimethyl benzyl ammonium bromide. Instead of having the enzymes, softeners, bactericides or water softening agents as a part of a detergent composition, they may be employed with suitable fillers and builders, such as those previously described, in compositions intended primarily for pre-soak actions, fabric softening, etc. In such compositions the active ingredients may be from 0.1 to 50% and builders and fillers may constitute the balance of the product, in addition to the described proportions of fluorescent brighteners and dyes.

In highly preferred detergent compositions, such as those illustrated in the present examples, the anionic detergent, a sodium salt of a higher linear tridecyl benzene sulfonic acid, is from 7 to 15% of the product and the nonionic detergent, a higher fatty alcohol condensation product with ethylene oxide, is 1 to 4%. In such products the proportion of higher fatty alcohol to ethylene oxide, on a molar basis, is from about 1:8 to 1:14. Also, the builder salt present in this detergent is from 20 or 25 to 35% of pentasodium tripolyphosphate and 5 to 10% of sodium silicate of $Na_2O:SiO_2$ ratio of from 1:2 to 1:3. The best products described herein have from 25 to 50% of sodium sulfate filler present and are of particle sizes such that none are larger than the opening of a No. 8 U.S. Standard Sieve Series sieve and no more than 10% passes through a No. 100 sieve. However, particles within the 6 to 160 mesh range are also acceptable. Such products are preferably made by spray drying of an aqueous crutcher mix, in which the preferred builder is pentasodium tripolyphosphate. Of course, when non-phosphate detergents are being made the phosphate will be replaced by sodium silicate, sodium silicate and sodium carbonate or sodium silicate and sodium sulfate, in combinations.

The spray drying operation is effected from a crutcher mix containing 30 to 70% of normally solid materials, the balance usually being water or other suitable aqueous medium. Less than 0.01% of the mix present is compatible blue dyestuffs of different shades. Mixing may be carried out at suitable temperatures from room temperature (20° C.) to 90° C. and spray drying is effected through spray nozzles at high pressures, e.g., 300 to 1,000 lbs. per square inch, into a drying gas at a temperature of from 110 to about 400° C. Either concurrent of countercurrent spray towers may be employed. Due to the content of alkaline builder materials, the crutcher mix will normally have a pH in the range of from 9 to 11 and, despite such pH and the high temperatures of drying, the present dyes are not altered in color during processing.

Instead of spray drying, the dyes and brighteners may be post-sprayed in solution onto detergent particles or onto a proportion of such particles. If desired, the dyes can be employed to color only a proportion of particulate solid materials, e.g., from 0.2 to 10%, preferably from 0.5 to 5% thereof. The colors may be bright if high concentrations are employed on only a small proportion of the particles or may be very light, as when the dyes are distributed evenly over all the particles. If desired other obscuring dyes may be employed, preferably "fugitive dyes" which do not have a permanent effect on the color of the fabrics treated. Such dyes include Polar Brilliant Blue RAW, Levalan Blue FFR and Acilan Sapphirol BNA; others are described in U.S. patent application S.N. 154,692 of V. Richter, for Colored Detergents, filed June 18, 1971.

The following examples illustrate the invention. Unless otherwise indicated, all parts are by weight and all temperatures are in ° C. in this specification.

EXAMPLE 1

A heavy duty synthetic detergent in particulate bead form is made by spray drying in a countercurrent drying tower a crutcher mix of the following constitution:

| | Parts |
|---|---|
| Water | 26.1 |
| Linear tridecylbenzene sulfonate slurry (56% solids, 87.5% active ingredient, on solids basis), sodium salt | 16.3 |
| Sodium silicate ($Na_2O:SiO_2=1:2.35$), 43.5% aqueous solution | 11.0 |
| Sodium sulfate, anhydrous | 21.5 |
| Higher fatty alcohol polyethoxylate [1] | 1.4 |
| Sodium carboxymethyl cellulose, 65% active | 0.5 |
| Soap (85:15 tallow:coco), 67% solids (Na soap) | 1.0 |
| Pentasodium tripolyphosphate | 22.0 |
| Solophenyl Violet 4BL dye | 0.0002 |
| Direct Brilliant Sky Blue 6B Extra Conc. | 0.0007 |
| Phorwite BHC | 0.18 |

[1] $C_{14-15}$ alcohol: ethylene oxide molar ratio of 11:1.

The crutcher mix is heated at about 60° C. for about five minutes after completion of the addition of all the components and is then pumped through spray nozzles and dried. Spraying pressure is about 600 lbs./sq. in. and the temperature of the drying air is about 300–400° C. The spray nozzles are of such sizes to produce spray dried beads in the 6 to 160 mesh range, U.S. Sieve Series. After completion of drying and cooling the beads are screened so as to reject those outside the mentioned size range. Moisture loss on drying is about 32%.

In another run the same formula is spray dried and is treated identically except for the inclusion in the crutcher mix of 1% of Polar Brilliant Blue RAW dye to color the beads a bright blue. These beads are blended with the others in a proportion of 1:100 to make a speckled appearing product. Alternatively, the blue dye is employed to color pentasodium tripolyphosphate granules, using the same proportion of coloring agent and base material, and the colored spray dried dots are blended with the first product described in 1:100 proportion. Such products are tested for detergency, whitening and brightening effects, compared to control commercial compositions containing about three times as much of a mixture of fluorescent brighteners (Oxazole brightener, stilbene brightener for cotton, Tinopal 5BM and Tinopal RBS) and are found to be decidedly superior to the control commercial detergent, being especially good in all applications wherein chlorine (hypochloride) or sunlight bleaching is employed. Such superiority is most pronounced for the washing of cotton items and the treatments of cotton or cotton-synthetic blend textiles. The laundering in which the invented products are superior is conducted in the usual manner, using an automatic washing machine, water at 60° F. and at 120° F., of normal hardness, about 100–150 p.p.m., as calcium carbonate, and for from 10 to 30 minutes, after which the wash is rinsed with clear water and the wash is dried, either in an automatic dryer or in direct sunlight. In the bleaching experiments, bleach is added with the detergent or is added in the rinse, using the standard bleaching proportions recommended by manufacturers of the commercial sodium hypochlorite bleaches used.

The tests employed to measure whiteness and brightness of the laundered cottons, synthetics and blend materials are standard evaluation methods, including electronic measurement and visual comparison by test panelists. By such tests the "experimental" products are best under all conditions, with cottons or synthetics. When tested under no-bleach conditions the presence of the dye system improves consumer acceptance of the whitening activity and results in findings that the experimental product, with less fluorescent brightener than a control, is as acceptable. Of course, it is superior in bleaching operations.

When the concentration of the fluorescent brightener is doubled in the products of the invention the result is a product far superior to the control under all conditions. However, it is preferred in such products to maintain the blue dye concentrations about the same as originally given or to increase them only slightly, to avoid imparting more of a blue tint than is necessary in the wash.

When the use concentration of the detergent is changed so that the concentration in the wash water is increased to 0.4% from the standard 0.15% or is decreased to 0.08% good brightening activities are noted, with the results being better for the more concentrated product. Also, when the wash load is changed from the standard 8 lbs./15 gallons to 12 lbs. and 4 lbs. per same water quantity, acceptable whitening and brightening are obtained and the superiority over the control compositions employed under the same conditions is maintained.

In modifications of the evaluation methods there are substituted for the LAS detergent lauryl alcohol sulfate, higher olefin sulfonate, lauryl polyethoxy sulfate, paraffin sulfonate, sodium higher fatty acid soap, Pluronic F-68, Neodol 4511, Plurafac B-26, and Igepal CO-630 nonionic detergents. In other experiments the builder salt composition is changed to all silicate, all carbonate or to include citrates or gluconates in place of the phosphate and silicate builders. Under the test methods described the experimental whitener-brightener system is rated superior to control systems of twice the fluorescent brightener contents, even when most washes utilize non-bleaching conditions.

Further variations of the above major experiment are made in which the bluing system is replaced with the same proportions of C.I. Direct Blue 98 and C.I. Acid Blue 205 or with different proportions of such dyes totalling 0.001 to 0.002% of the detergent. In such replacements the dyes are all calculated to be 100% for percentage computations. In such compositions, with the dyes changed or without such changes, the fluorescent brightener is replaced with an equal proportion of the bis(stilbene sulfonic acid) brightener. Such replacements give acceptable products, comparable with the initial one of this example and superior to a control of the type previously described, in consumer overall preferences. When variations of the various dyes are used, acid forms and alkali metal salts and in some cases, the copper complexes, activities are the same or substantially the same as for the originally described dyes. Similar actions are noted when the brightener salts or acid forms are used. Apparently, at the wash water pH, usually from 8.9 to 9.8, but sometimes (with the high carbonate and high silicate formulas) up to 10.4, the dyes and brighteners are present as the same salts or ions.

EXAMPLE 2

A spray dried laundry detergent is prepared of the formula:

| | Parts |
|---|---|
| Neodol 4511 | 10.0 |
| Sodium carbonate | 45.0 |
| Sodium silicate ($Na_2O:SiO_2=1:2.35$) | 18.4 |
| Sodium carboxymethyl cellulose | 0.5 |
| Sodium sulfate, anhydrous | 15.3 |
| Water | 10.5 |
| Phorwite BHC brightener | 0.3 |
| Direct Brilliant Sky Blue 6B Extra Conc. dye | 0.001 |
| Solophenyl Violet 4BL dye | 0.0003 |

Spray drying of the above product is from a 65% solids aqueous crutcher mix according to the conditions of Example 1, with the product being screened to 8 to 100 mesh U.S. Sieve sizes. The product is a light blue in color and may be colored with other dyes, especially fugitive dyes such as Polar Brilliant Blue, if desired. Part of the nonionic detergent may be added to it in a post-spraying operation, if excessive losses out the tower are encountered in the spray drying.

This detergent, when tested as described in Example 1, is superior to a control with the content of selected, effective fluorescent brighteners therein being twice as great. This is surprising because the control contains some Tinopal RBS, which exhibits stability to hypochlorite bleach although it is not as light stable as the preferred brighteners employed in the invention.

When sodium perborate is present in the detergent of this example, in replacement of the sodium sulfate content thereof, the bleaching detergent produced is better than a control of the same formula except for the brightener system, when tested by the methods given in Example 1.

EXAMPLE 3

A laundry soap powder is made by mixing together granular materials of the formula:

| | Parts |
|---|---|
| Sodium coco-tallow soap (20:80) | 65.0 |
| Sodium carbonate | 11.3 |
| Sodium silicate | 10.0 |
| Sodium chloride | 2.5 |
| Perfume | 0.1 |
| Water | 10.8 |
| Brightener-dye system of Ex. 1 | 0.3 |

EXAMPLE 4

A fabric softener composition is made of the formula:

| | Parts |
|---|---|
| 2-heptadecyl-1-methyl-1[(2-stearoylamido)ethyl] imidazolinium methyl sulfate, 75% active ingredient | 9.5 |
| Brightener-dye composition of Ex. 1 | 0.4 |
| Perfume | 0.5 |
| Denatured alcohol | 8.0 |
| Water | 81.6 |

EXAMPLE 5

A pre-soak composition for removing stains from laundry is of the following formula:

| | Parts |
|---|---|
| Linear tridecyl benzene sodium sulfonate | 6.0 |
| Pentasodium tripolyphosphate | 25.0 |
| Sodium carbonate | 44.6 |
| Sodium silicate | 7.0 |
| Sodium sulfate | 10.3 |
| Protease enzyme (Alcalase, manufactured by Novo Industries) | 0.8 |
| Water | 6.0 |
| Fluorescent Brightener-Dye System of Example 1 formula | 0.3 |

The products of Examples 3–5, when tested against the same product formulations except for the replacement of the brightener-dye system of the invention with 2 to 3 times as much of previously accepted standard brightener combinations, in which the major brightener constituents are not chlorine- and/or light-stable, are superior in whiteness and brightness, with respect to cottons and synthetics. Such improved appearances are also the result after normal treatments, such as washing, which follow pre-soak use of the product of Example 5. Essentially the same results are obtained when the bis(stilbene sulfonic acid) replaces the BHC brightener and when dyes C.I. Direct Blue 98 and Acid Blue 205 are used in 0.0005 to 0.001 to 0.001 to 0.002% concentrations, respectively, in the products.

EXAMPLE 6

| | Parts |
|---|---|
| Phorwite BHC | 2.8 |
| Solophenyl Violet 4BL | 0.03 |
| Direct Brilliant Sky Blue 6B | 0.1 |
| Sodium sulfate | 97.1 |

The above composition is made by mixing the various constituents thereof or by spray drying an aqueous crutcher mix. As particles of 6 to 160 mesh it may be added to wash water, detergents, pre-soak compositions, softeners, anti-static agents, water softening chemicals, germicides, etc., to give them the property of whitening and brightening textiles and laundry to which they are applied. The described dye-brightener particles are convenient ways of adding the whitening and brightening power in the desired amount to any of various compositions without having to spray separate formulations for each one. In other words, super-brightening compositions or standard ones may be produced, as desired, by the addition or omission of the composition of this example to a standard product of a type listed above.

The products and methods of this invention advantageously overcome difficulties previously encountered utilizing economic proportions of the improved fluorescent brighteners which are chlorine- and light-stable. Although such brighteners will be included in deteregnt compositions intended for use when bleaching is effected the product must also be superior or at least equal in brightening effect when bleaching is not employed because many consumers will use whatever detergent is on hand and will be disappointed in poor brightening effects even if the detergent is not intended for the use to which it is put by them. Also, even if a consumer normally does not bleach clothes and therefore could employ a prior art or standard detergent composition with the usual brighteners, bleaching will sometimes be effected and the present detergents are suitable for both bleaching and non-bleaching uses. The importance of using a bleach-stable brightener-containing composition is better understood when it is realized that even one bleaching operation removes a useful and effective brightener deposit on the clothes that has built up over several washings and therefore it is important that the brightener deposited should be bleach stable. A further advantage of the present compositions is that a lesser quantity of fluorescent brightener is consumed and discharged to sewers, treatment plants and streams.

The fluorescent brighteners and dyes described are compatible with the detergents and builders and tolerate well the alkaline pH's of such compositions. In fact, they are desirably substantive at such pH's and under washing conditions despite the presence of cleaning agents which normally counteract sorptions of various materials. The dyes employed, while capable of tinting the product, in normal concentrations may be included in particles which appear light colored or almost white. Thus, such products may be colored with other dyes without interference. If desired, the dyes and fluorescent brighteners may be included in a portion of the particulate detergent, allowing easy blending to adjust dye-brightener concentrations.

The various advantages of the invention are highly significant in making the bleach-resistant dyestuffs utilized herein and detergents containing them commercially feasible. The invention has allowed a decrease in the use of quantities of fluorescent dyes and detergent materials without loss of brightening effect and whiteness. Of course, detergent manufacturers continue to concentrate on cleaning materials and textiles being washed and treated, rather than merely brightening them but brightening is an essential property required of every commercially successful detergent today. The compositions of the present invention clean well and brighten, too, leading to them being favored for these actions against leading detergents on the market.

The invention has been described with respect to various examples and illustrations thereof but is not to be limited to these because it is clear that one of skill in the art, with the benefit of the present specification before him, will be able to substitute equivalents for components and steps of the invention without departing from its spirit or going beyond its scope.

What is claimed is:

1. A composition for increasing the apparent whiteness of laundry to the human eye which comprises a blue dye or mixture of such dyes which is substantive to articles of laundry to which it is applied from a dilute aqueous solution and is capable of tinting such items with a slight blue color bleachable therefrom by a chlorine bleach selected from the group consisting of C.I. Direct Blue 1, C.I. Direct Violet 66, C.I. Acid Blue 205 and C.I. Direct Blue 98 dyes and mixtures thereof, a chlorine- and sunlight-resistant fluorescent brightener selected from the group consisting of 4,4'-bis(4-phenyl-2H-1,2,3-triazol-2-yl)-2,2'-stilbene disulfonic acid, salts thereof, bis(stilbene sulfonic acid), salts thereof, and mixtures thereof, and at least one organic detergent selected from the group consisting of anionic, nonionic and amphoteric detergents.

2. A composition according to claim 1 which comprises from 1 to 100 parts of C.I. Direct Violet 66, 3 to 300 parts of C.I. Direct Blue 1 and 100 to 1,000 parts of a di-alkali metal salt of 4,4'-bis(4-phenyl-2H-1,2,3-triazol-2-yl)-2,2'-stilbene disulfonic acid, bis(stilbene sulfonic acid) or a mixture thereof.

3. A composition according to claim 1 wherein the weight of fluorescent brightener is from 2 to 1000 times the weight of the total of the dyes.

4. A composition according to claim 3 wherein the detergent composition is a heavy duty built synthetic anionic-nonionic detergent composition in particulate form comprising from 5 to 30% of a synthetic anionic organic detergent or mixture thereof selected from the group consisting of linear higher alkyl benzene sulfonates, higher fatty alcohol sulfates, higher fatty alcohol ethoxylate sulfates, higher olefin sulfonates and higher fatty acid soaps, from 1 to 10% of a nonionic detergent or mixture selected from the group consisting of ethylene oxide condensates with higher aliphatic alcohols, ethylene oxide condensates with middle alkyl phenols and ethylene oxide condensates with polypropylene oxide and polypropylene glycol, with the proportion of nonionic being less than half the proportion of anionic detergent present, and 20 to 95% of builder or builder mixture selected from the group consisting of pentasodium tripolyphosphate, trisodium nitrilotriacetate, sodium silicate, sodium carbonate, sodium citrate and sodium gluconate, the detergent compositions being a spray dried product, the particles of detergent, in which the color and brightener are incorporated, being substantially globular in shape and of sizes substantially within the range of 6 to 160 mesh, and the fluorescent brightener being the dipotassium salt of 4,4'-bis(4-phenyl-2H-1,2,3-triazol-2-yl)-2,2'-stilbene disulfonic acid.

5. A composition according to claim 1 wherein said detergent is linear tridecylbenzene sulfonate.

6. A composition according to claim 1 wherein said detergent is a mixture of linear tridecylbenzene sulfonate and $C_{14}$–$C_{15}$ alcohol polyethoxylate, the molar ratio of ethylene oxide being 11:1.

7. A composition according to claim 1, further containing builder salt.

8. A composition according to claim 7 wherein said builder salt is phosphate builder and constitutes from 10 to 40% of the composition.

9. A composition according to claim 7 wherein said builder is a mixture of pentasodium tripolyphosphate and sodium silicate having an $Na_2O:SiO_2$ ratio of from 1:2 to 1:3.

10. A composition according to claim 7 further containing an enzyme.

11. A composition according to claim 10 wherein said enzyme is a proteolytic enzyme.

12. A composition according to claim 3 further containing sodium sulfate.

13. A composition according to claim 3 further containing fabric softener.

14. A compoition according to claim 13 wherein said softener is 2-heptadecyl-1-methyl-1-[(2-stearoylamido)ethyl]imidazolinium methyl sulfate.

15. A composition according to claim 14 consisting essentially of a detergent composition comprising from 5 to 30% of a synthetic anionic organic detergent or mixtures thereof selected from the group consisting of linear higher alkyl benzene sulfonates, higher fatty alcohol sulfates, higher fatty alcohol ethoxylate sulfates, higher olefin sulfonates and higher fatty acid soaps, from 1 to 10% of a nonionic detergent or mixture selected from the group consisting of ethylene oxide condensates with higher aliphatic alcohols, ethylene oxide condensates with middle alkyl phenols and ethylene oxide condensates with polypropylene oxide and polypropylene glycol, with the proportion of nonionic being less than half the proportion of anionic detergent present, and 20 to 95% of builder or builder mixture selected from the group consisting of pentasodium tripolyphosphate, trisodium nitrilotriacetate, sodium silicate, sodium carbonate, sodium citrate and sodium gluconate said dye(s) and brightener being from 0.04 to 40% of the weight of said detergent composition and being substantially globular in shape and of sizes substantially within the range of 6 to 160 mesh.

16. A composition according to claim 15 wherein said brightener is the dipotassium salt of 4,4'-bis(4-phenyl-2H-1,2,3-triazol-2-yl)-2,2'-stilbene disulfonic acid.

17. A composition according to claim 15 wherein said brightener is bis(stilbene sulfonic acid).

18. A method of increasing the apparent whiteness of laundry to the human eye which comprises contacting such laundry with a dilute aqueous solution of the composition of claim 7 for a period from five minutes to one hour, after which said laundry is rinsed with water and dried.

19. A method according to claim 18 wherein the dye is a mixture of C.I. Direct Violet 66 and C.I. Direct Blue 1, the fluorescent dye is bis(stilbene sulfonic acid), the dye and fluorescent brightener are applied to cotton laundry in an aqueous solution with from 0.1 to 0.4% of a detergent composition comprising 5 to 30% of a synthetic anionic organic detergent or mixture thereof selected from the group consisting of linear higher alkyl benzene sulfonates, higher fatty alcohol ethoxylate sulfates, higher fatty alcohol sulfates, higher olefin sulfonates and higher fatty acid soaps, from 1 to 10% of a nonionic detergent or mixture selected from the group consisting of ethylene oxide condensates with higher aliphatic alcohols, ethylene oxide condensates with middle alkyl phenols and ethylene oxide condensates with polypropylene oxide and polypropylene glycol, with the proportion of nonionic being less than half the proportion of anionic detergent present, and 20 to 95% of builder or builder mixture selected from the group consisting of pentasodium tripolyphosphate, trisodium nitrilotriacetate, sodium silicate, sodium carbonate, sodium citrate and sodium gluconate, at a temperature of from 10 to 90° C. for a period from five minutes to one hour, after which laundry is rinsed with water and dried.

References Cited

UNITED STATES PATENTS

| Number | Date | Name | Class |
|---|---|---|---|
| 2,930,760 | 3/1960 | Gebhardt | 252—110 |
| 2,893,818 | 7/1959 | Millsaps | 8—77 |
| 539,699 | 5/1895 | Moeller | 260—182 |
| 579,773 | 3/1897 | Rudolph | 260—183 |
| 1,889,732 | 11/1932 | Strusser et al. | 260—183 |
| 2,656,099 | 10/1953 | Selling | 235—61 |
| 2,506,020 | 5/1950 | Grossmann et al. | 8—25 |
| 2,342,191 | 2/1944 | Grossmann | 8—25 |
| 3,467,645 | 9/1969 | Keller et al. | 260—174 |
| 3,445,451 | 5/1969 | Grimmel et al. | 260—148 |
| 2,141,589 | 12/1938 | Bishop | 8—77 |

GEORGE F. LESMES, Primary Examiner

W. R. DIXON, Jr., Assistant Examiner

U.S. Cl. X.R.

8—25, 41 R, DIG. 14, 77; 252—89, 8.7, 534, DIG. 12